(12) United States Patent
Kalampoukas et al.

(10) Patent No.: US 10,346,474 B1
(45) Date of Patent: Jul. 9, 2019

(54) SYSTEM AND METHOD FOR DETECTING REPEATING CONTENT, INCLUDING COMMERCIALS, IN A VIDEO DATA STREAM USING AUDIO-BASED AND VIDEO-BASED AUTOMATED CONTENT RECOGNITION

(71) Applicant: Alphonso Inc., Mountain View, CA (US)

(72) Inventors: Lampros Kalampoukas, Brick, NJ (US); Manish Gupta, Bangalore (IN); Zhengxiang Pan, Edison, NJ (US)

(73) Assignee: Alphonso Inc., Mountain View, CA (US)

( * ) Notice: Subject to any disclaimer, the term of this patent is extended or adjusted under 35 U.S.C. 154(b) by 0 days.

(21) Appl. No.: 15/941,478

(22) Filed: Mar. 30, 2018

(51) Int. Cl.
| | |
|---|---|
| *H04N 7/173* | (2011.01) |
| *G06F 16/783* | (2019.01) |
| *H04N 21/84* | (2011.01) |
| *H04N 21/81* | (2011.01) |
| *G06F 16/9535* | (2019.01) |
| *G06F 16/2457* | (2019.01) |

(52) U.S. Cl.
CPC .... *G06F 16/7834* (2019.01); *G06F 16/24578* (2019.01); *G06F 16/9535* (2019.01); *H04N 21/812* (2013.01); *H04N 21/84* (2013.01)

(58) Field of Classification Search
CPC .............................. H04N 21/812; H04N 21/84
USPC ........................................................ 725/131
See application file for complete search history.

(56) References Cited

U.S. PATENT DOCUMENTS

| | | | |
|---|---|---|---|
| 8,700,641 B2* | 4/2014 | Covell | G06F 17/30743 707/749 |
| 8,996,810 B2* | 3/2015 | Liang | G06F 12/0806 711/119 |
| 9,508,194 B1 | 11/2016 | Worley, III | |
| 2003/0101144 A1 | 5/2003 | Moreno | |
| 2003/0121046 A1 | 6/2003 | Roy et al. | |

(Continued)

OTHER PUBLICATIONS

Brandon Satterwhite and Oge Marques, "Automatic Detection of TV Commercials." (Satterwhite, B.; Marques, O.; Potentials, IEEE, vol. 23, Issue 2, Apr.-May 2004, pp. 9-12 (4 pages).

(Continued)

*Primary Examiner* — Michael B. Pierorazio
(74) *Attorney, Agent, or Firm* — Panitch Schwarze Belisario & Nadel LLP

(57) ABSTRACT

Methods and apparatus are provided for detecting potential repeating content, such as commercials, in a video data stream by receiving one or more video data streams, parsing each video data stream into a plurality of segments, creating audio fingerprints of each segment, storing the plurality of audio fingerprints in a database, and identifying any audio fingerprints in the received and parsed one or more video data streams that match audio fingerprints in the database that were previously stored from video data streams that were previously received and parsed. Video fingerprints are then created for these same pairs of segments and a similarity analysis is performed. The results of the video fingerprint analysis is used to make a determination of subsequent actions to be taken by a content processing platform that performs recognition processing of the content associated with the segments identified as being potentially repeating content.

12 Claims, 10 Drawing Sheets

(56) References Cited

U.S. PATENT DOCUMENTS

| | | | |
|---|---|---|---|
| 2004/0226035 A1 | 11/2004 | Hauser | |
| 2005/0193016 A1 | 9/2005 | Seet et al. | |
| 2006/0041902 A1 | 2/2006 | Zigmond | |
| 2006/0245724 A1 | 11/2006 | Hwang et al. | |
| 2007/0124756 A1* | 5/2007 | Covell | G06F 17/30743 725/18 |
| 2008/0267584 A1 | 10/2008 | Green | |
| 2009/0254933 A1 | 10/2009 | Gupta et al. | |
| 2010/0246955 A1 | 9/2010 | Wright et al. | |
| 2010/0306808 A1 | 12/2010 | Neumeier et al. | |
| 2011/0145001 A1 | 6/2011 | Kim et al. | |
| 2011/0208722 A1 | 8/2011 | Hannuksela | |
| 2011/0289114 A1 | 11/2011 | Yu et al. | |
| 2013/0071090 A1 | 3/2013 | Berkowitz et al. | |
| 2013/0160038 A1 | 6/2013 | Slaney et al. | |
| 2013/0205318 A1 | 8/2013 | Sinha et al. | |
| 2014/0282673 A1 | 9/2014 | Neumeier et al. | |
| 2015/0082349 A1 | 3/2015 | Ishtiaq et al. | |
| 2016/0037232 A1 | 2/2016 | Hu et al. | |
| 2016/0156972 A1* | 6/2016 | Oztaskent | H04N 21/44222 725/14 |
| 2016/0205289 A1 | 7/2016 | Li et al. | |
| 2017/0094349 A1* | 3/2017 | Maughan | H04N 21/44204 |

OTHER PUBLICATIONS

Wikipedia entry for "Automatic Content Recognition." downloaded from web page: https://en.wikipedia.org/w/index.php?title=Automatic_content_recognition&printable=yes, download date: Aug. 11, 2016, 4 pages.

Audible Magic® product brochures: Core Technology & Services Overview, Broadcast Monitoring, and Media Identification, Audible Magic Corporation, Los Gatos, California, downloaded from web pages at http://www.audiblemagic.com, download date: Aug. 11, 2016, 11 pages.

Gracenote Entourage™, Gracenote, Inc., Emeryville, California, downloaded from webpage: http://www.gracenote.com/video/media-recognition-and-insights/, download date: Aug. 24, 2016, 5 pages.

Office Action dated Jun. 27, 2017 in U.S. Appl. No. 15/341,436, by Trinh.

Int'l Search Report and Written Opinion dated Dec. 11, 2017 in Int'l Application PCT/US17/57952.

Gracenote Media Recognition/Gracenote Video ACR, downloaded from webpage: http://www.gracenote.com/video/media-recognition/#, download date: Feb. 23, 2018, 10 pages.

GOOGLE Cloud Vision API, downloaded from webpage: http://cloud.google.com/vision/, download date: Feb. 23, 2018, 7 pages.

Int'l Preliminary Report on Patentability dated Dec. 17, 2018 in Int'l Application No. PCT/US2017/058285.

* cited by examiner

US 10,346,474 B1

SYSTEM AND METHOD FOR DETECTING REPEATING CONTENT, INCLUDING COMMERCIALS, IN A VIDEO DATA STREAM USING AUDIO-BASED AND VIDEO-BASED AUTOMATED CONTENT RECOGNITION

CROSS-REFERENCE TO RELATED APPLICATIONS

This application is related to U.S. application Ser. No. 15/341,436 filed Nov. 2, 2016.

BACKGROUND OF THE INVENTION

TV advertising commercials exist in virtually all video data streams, subsidizing some or all of the cost of providing the content to the viewer. The ability to identify where the commercials exist in the video data stream has become an important goal for two main reasons. First, advertisers who pay to place the commercials wish to verify that the commercials were actually played, either by being "aired" during a broadcast, or "streamed" during an internet-based viewing session. The auditing process can be greatly enhanced if commercials can be identified as they are being played so that there can be a recordation to document the airing or streaming. Second, technology built into a video playing device, or executing concurrently with a video playing device, can "skip" commercials, assuming that the location of the commercials can be accurately identified so that no programming is skipped. Some conventional technology for identifying where commercials exist in a video data stream is described in an article entitled "Automatic Detection of TV Commercials" (Satterwhite, B.; Marques, O.; Potentials, IEEE, Volume 23, Issue 2, April-May 2004 pp. 9-12). Satterwhite et al. describes two main categories of methods for detecting commercials, namely, "feature-based detection" and "recognition-based detection." Feature-based detection uses general characteristics of commercials embedded within a media stream to detect their possible presence. Recognition-based detection works by trying to match commercials with ones that were already learned. Some general characteristics (heuristics) of commercials and commercial breaks include the following:

i. Multiple frames of black are displayed at the beginning and end of each commercial block and between each commercial in the block. There is no audio during these frames.
  ii. If a network displays a logo in the corner of the screen, the logo will not appear during the commercials.
  iii. Duration is typically some increment of 15 seconds, up to 90 seconds.
  iv. Commercials are high in "action," measured by a relatively larger number of cuts per minute between frames compared to a TV show.
  v. Commercial breaks tend to occur at the same time in each episode of a given TV series.

The conventional technology for identifying where commercials exist in a video data stream have numerous disadvantages which limit their effectiveness. Accordingly, there is a need for new approaches for identifying where commercials exist in a video data stream. The present invention fulfills such a need.

There are also instances where it is desirable to identify "repeating content" in video data streams. The present invention also fulfills this need.

SUMMARY OF THE PRESENT INVENTION

Methods and apparatus are provided for detecting potential repeating content, such as commercials, in a video data stream by receiving one or more video data streams, parsing each video data stream into a plurality of segments, creating audio fingerprints of each segment, storing the plurality of audio fingerprints in a database, and identifying any audio fingerprints in the received and parsed one or more video data streams that match audio fingerprints in the database that were previously stored from video data streams that were previously received and parsed. Video fingerprints are then created for these same pairs of segments and a similarity analysis is performed. The results of the video fingerprint analysis is used to make a determination of subsequent actions to be taken by a content processing platform that performs recognition processing of the content associated with the segments identified as being potentially repeating content.

BRIEF DESCRIPTION OF THE DRAWINGS

Preferred embodiments of the present invention will now be described by way of example with reference to the accompanying drawings.

DETAILED DESCRIPTION OF THE INVENTION

Figure 1:
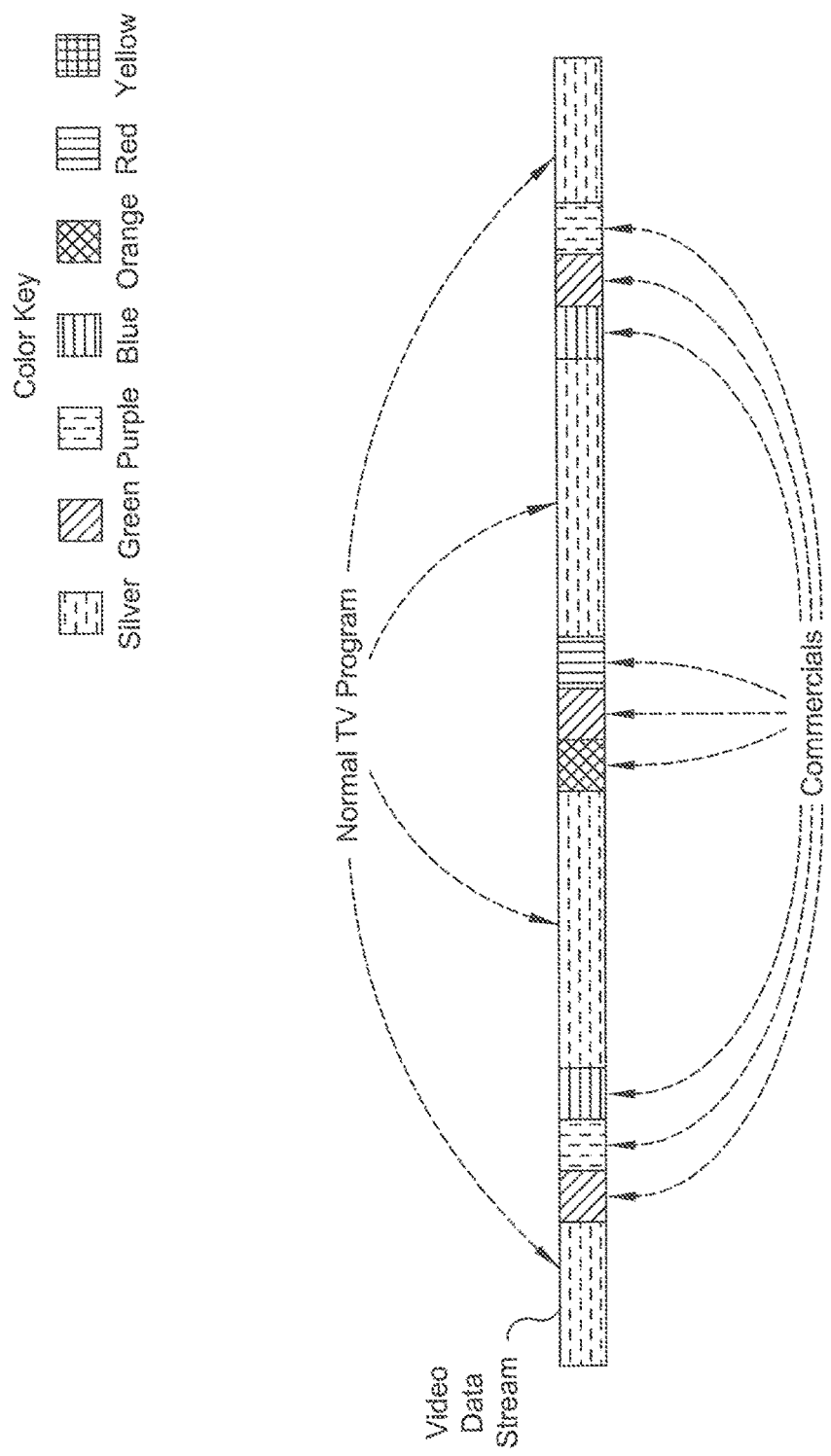
FIGS. 1-4 show an overview of one preferred embodiment of the present invention for detecting commercials in a video data stream.

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

video data stream (also, referred to interchangeably as a "TV stream" and a "TV channel stream")—A video data stream includes (i) a conventional broadcast TV signal, typically delivered over a cable or fiber optic network via a set top box, CableCARD® or the like to a TV, (ii) an over-the-air (OTA) broadcast TV signal, and (iii) streaming services that deliver video content to a TV device that is connected to a viewer's home network. A video data stream may also be referred to as a "stream of audiovisual data" or an "audiovisual stream" since a video data stream typically includes audio.

segment (also, referred to interchangeably as a "content segment")—A segment is a portion of a video data stream that spans a time length. The segment includes the contents of the video data stream within that time length.

segment representation—a representation of a segment that can be easily used by a search engine for virtually instantaneous comparison with a stored database of segment representations. In one preferred embodiment, the segment representation is a digital signature of the segment, such as a segment fingerprint. However, other types of segment representations are within the scope of the present invention.

neighboring segment representation—a segment representation that is next to or very near another segment representation with respect to the timestamps of the corresponding segments. "Neighboring" as used herein does not necessarily require immediate adjacency. That is, there may be a small time gap between the corresponding segments filled by other segments.

commercial (also, referred to interchangeably as an "advertisement" or "ad")—A "commercial" is an advertisement for a product or service, and also includes advertising for program type content, known in the TV industry as a "promo." A commercial is thus distinguishable from "program type content." An example of "program type content" is a TV show.

commercial break (also, referred to interchangeably as a "block of commercial content," "commercial block," "ad block," or "ad pod")—Each commercial break includes a plurality of successive individual commercials. That is, the commercials are aired back-to-back in a set or group. Commercial breaks are interspersed during a TV program. The total length of the commercial breaks aired during a TV show is almost always significantly shorter than the length of the TV show. Likewise, the length of one commercial break is almost always significantly shorter than the lengths of the TV show segments that precede and follow the commercial break. A typical broadcast TV channel airs about 20 minutes of commercial content per hour. One common format for a commercial break is to show national advertisements first, followed by regional/local advertisements, and concluding with promos.

clip—The video data stream may be clipped between a start time and a stop time so as to capture a segment of interest, typically a potential commercial that has not yet been identified.

repeating content—Repeating content is any content that appears more than once over a time period of interest. Examples of repeating content include commercials and program type content (e.g., a TV show) that is rebroadcast. The time period of interest may be finite or infinite.

II. Detailed Disclosure

FIGS. 1-4 show an overview of one preferred embodiment of the present invention for detecting commercials in a video data stream. In this example, the video data stream is a live TV stream (e.g., TV channel) wherein commercial breaks are interspersed during a normal TV program. Here, each commercial break includes three commercials.

Figure 2:
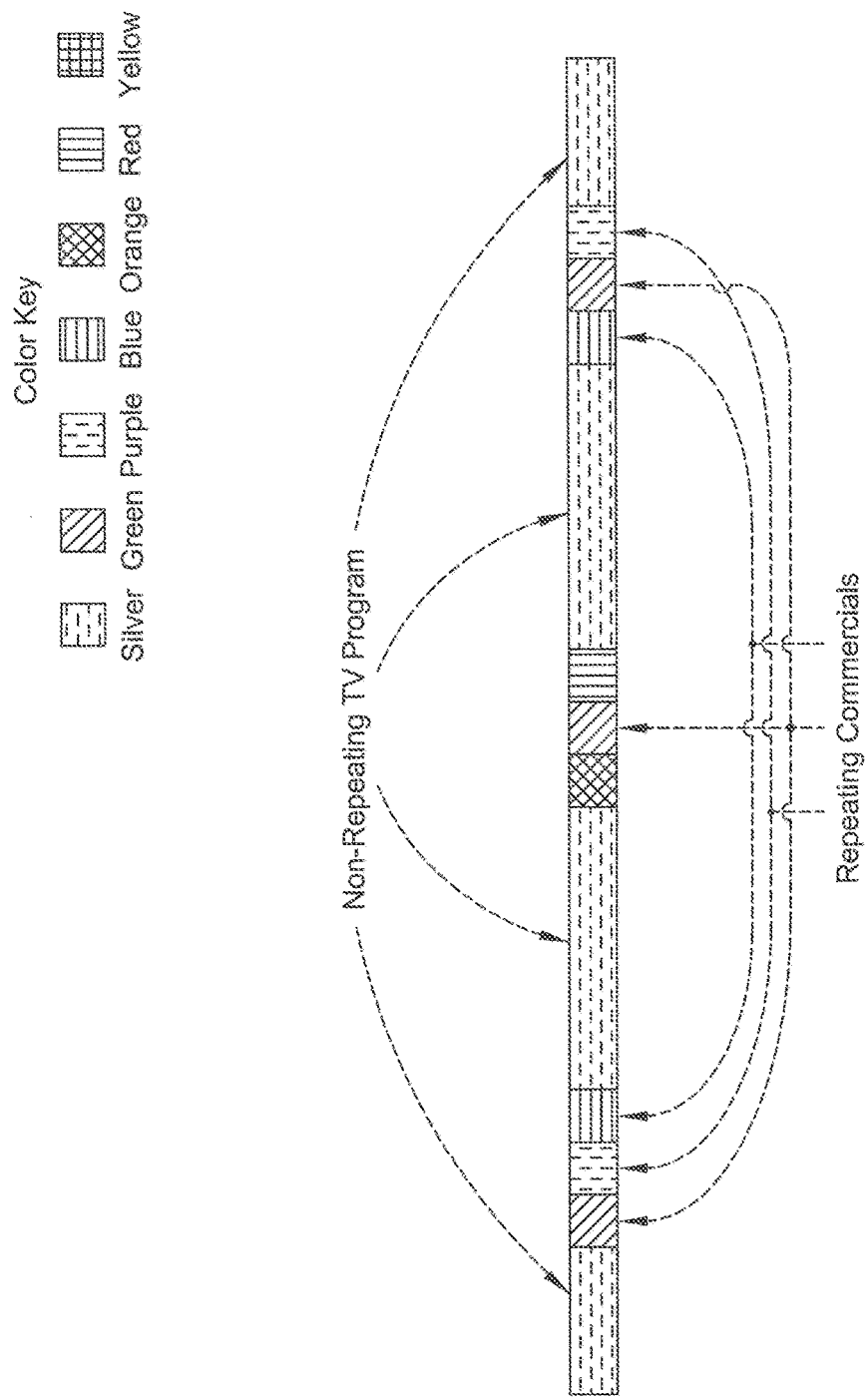

One of the differences between commercials and program type content (e.g., a TV show) is that the contents of commercials often repeat as shown in FIGS. 1 and 2. In fact, commercials are almost always repeated shortly after an initial airing since they are typically shown as part of a coordinated ad campaign. A commercial may be repeated on the same TV channel an/or on a different TV channel, especially in the case of national advertisements. The colored square blocks in FIGS. 1 and 2 are commercials which are repeatedly aired. FIG. 2 also identifies non-repeating TV program type content. In this simplified example, the TV show does not repeat. However, over a longer time frame (e.g., one week or one month), some TV shows will repeat by being rebroadcast. However, in a shorter time frame (e.g., one day or one week), the TV show may not repeat. Thus, in a shorter time frame, a general observation can be made that commercials are repeatedly broadcasted or aired whereas TV shows are not repeated as often. This fact, along with the fact that commercials are shorter than TV shows, can be exploited to detect and clip commercials out of video data streams.

Figure 3:
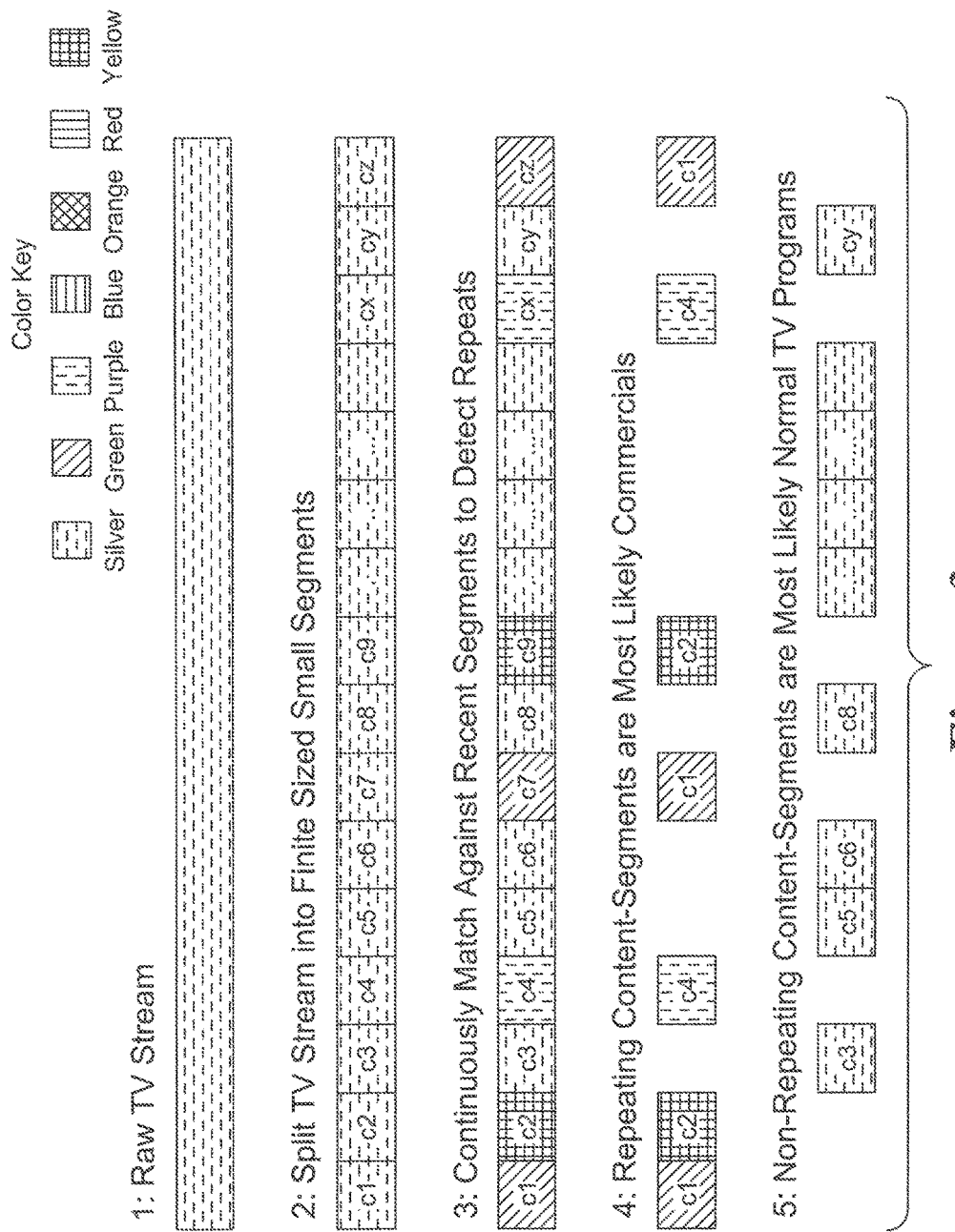

FIG. 3 shows an overview of the process implemented by the following steps which correlate to the five numbered content streams of FIG. 3:

1. Receive a video data stream (raw TV stream).

2. Split the video data stream into small finite sized content segments ($c_1$, $c_2$, $c_3$, . . . $c_x$, $c_y$, $c_z$ are the content segments).

3. Continuously match each and every new content segment against a group of previously stored content segments from video data streams that were previously aired or streamed in the recent past. For example:

$c_7$ and $c_z$ matched $c_1$ $c_9$ matched $c_2$ $c_x$ matched $c_4$

4. Any content which is observed to be repeatedly appearing in a video data stream can be declared most likely to be a commercial. For example, $c_1$, $c_2$ and $c_4$ are most likely commercials.

5. Any content which is found to be not repeating (in the recent past) can be declared to be program type content (e.g., a TV show). For example, $c_3$, $c_5$, $c_6$, $c_8$, . . . $c_y$ are most likely program type content.

Figure 4:
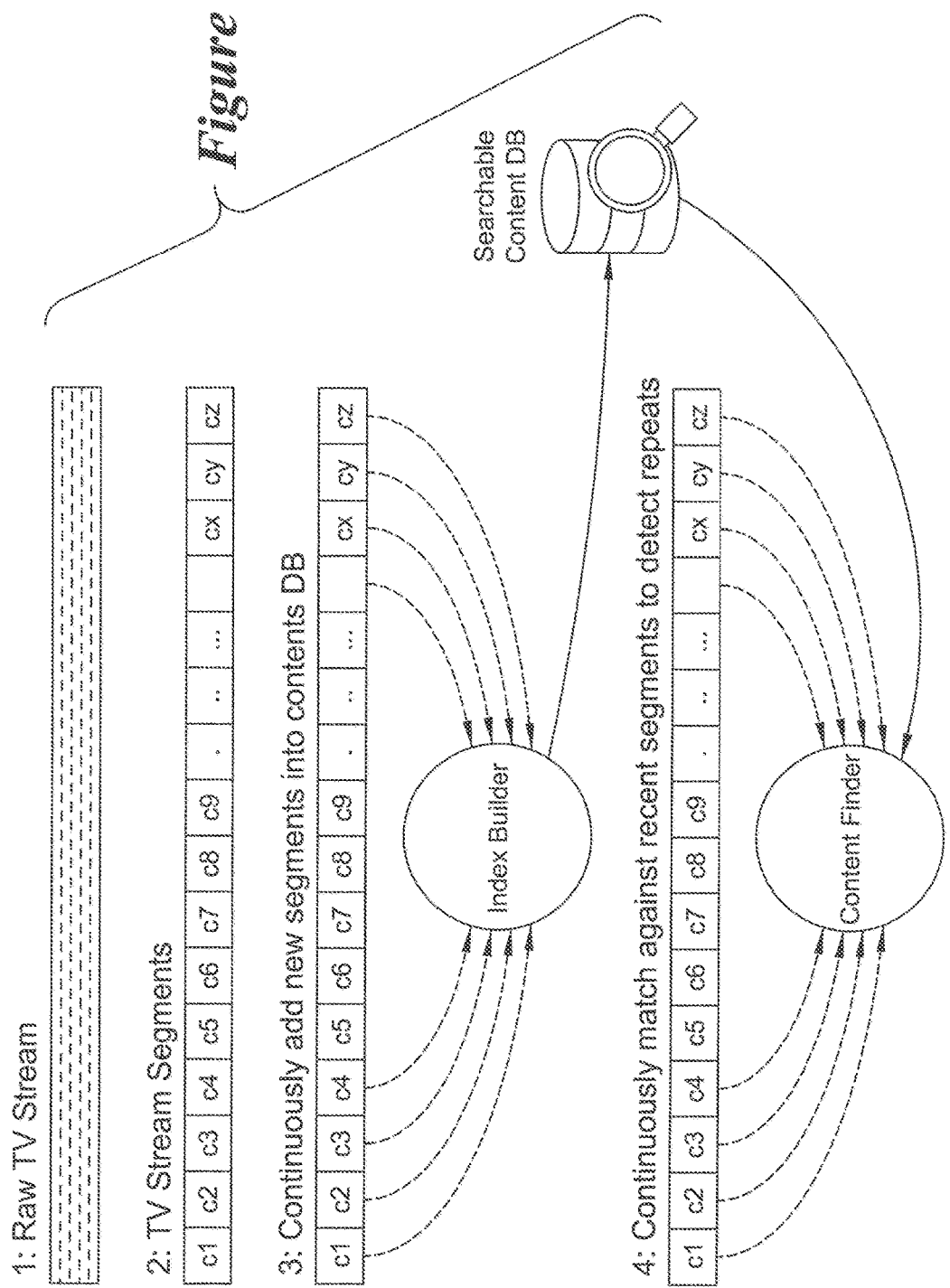

FIG. 4 shows an overview of system components for implementing the process described above, wherein the following steps correlate to the four numbered content streams of FIG. 3:

1. A system (shown in more detail in FIG. 5) receives a video data stream (raw TV stream).

2. The system splits the video data stream into small finite sized content segments ($c_1$, $c_2$, $c_3$, . . . $c_x$, $c_y$, $c_z$ are the content segments).

3. The system continuously pushes the content segments into a searchable contents database which indexes the content segments.

4. The system continuously (in parallel) searches for a match for each and every content segment in the contents database which, in one preferred embodiment, contains only recently aired or streamed contents.

FIGS. 1-4 show only one video data stream. However, a plurality of video data streams (e.g., hundreds of TV channels) are preferably processed concurrently in the same manner. Since commercials may air on multiple TV channels, a commercial first aired on a first channel may be aired again on a different channel shortly thereafter. Thus, the system is designed to simultaneously ingest and process multiple video data streams.

Figure 5:
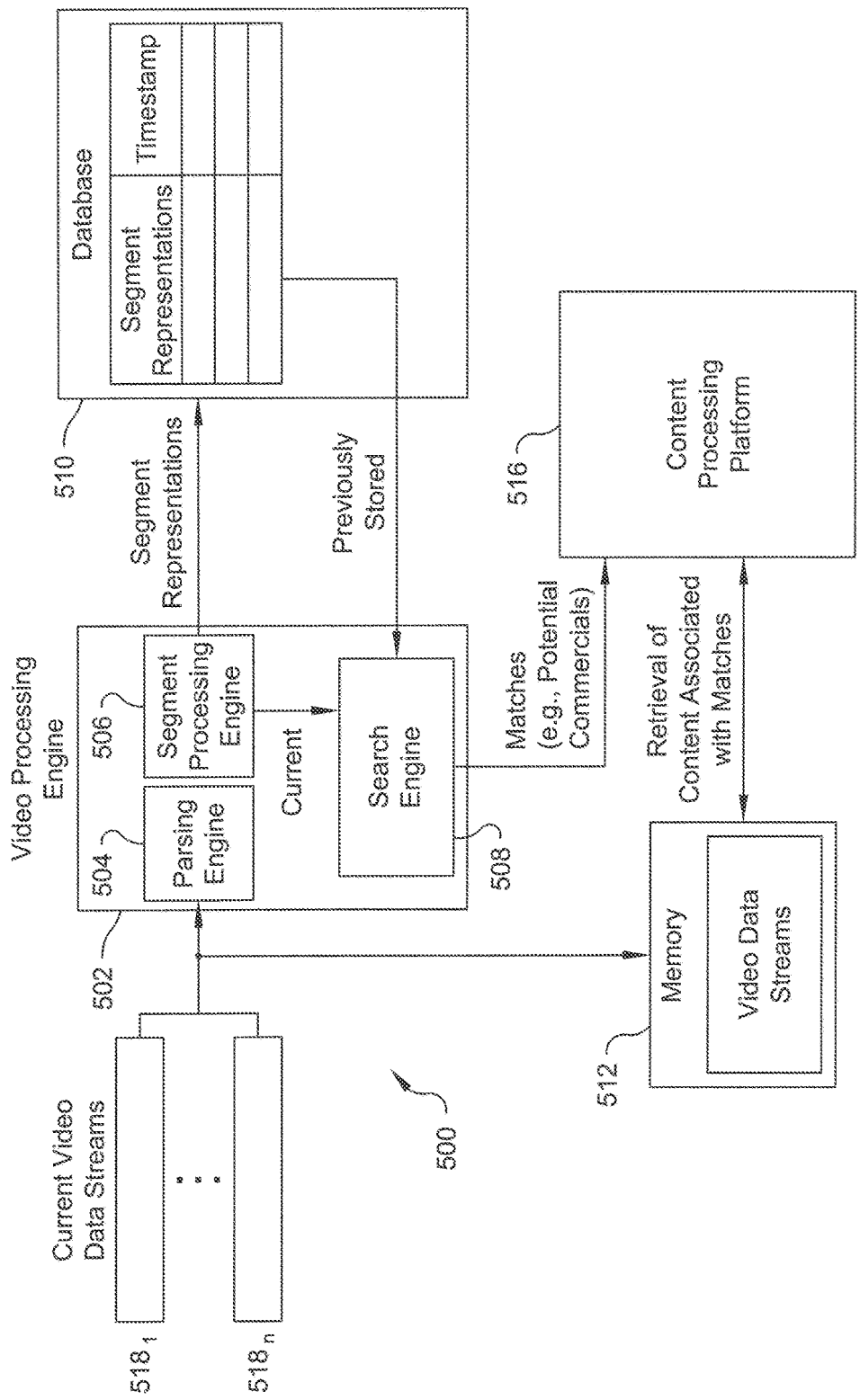
FIG. 5 is a schematic diagram of a system for implementing one preferred embodiment of the present invention.

FIG. 5 shows a schematic diagram of a system 500 for implementing one preferred embodiment of the present invention. System components include a video processing engine 502 including a parsing engine 504, a segment processing engine 506 and a search engine 508; a database 510; a memory 512 (persistent storage); and a content processing platform 516. Current video data streams $518_1$ to $518_n$, feed into the video processing engine 502 and the memory 512. The video processing engine 502 performs at least the following functions:

1. Parses the current video data streams into a plurality of segments.

2. Creates a representation of each segment. In one preferred embodiment, the representation is a digital signature of the segment, such as a segment fingerprint. However, other types of representations are within the scope of the present invention.

3. Communicates the segment representations to the database 510.

4. Identifies, using the search engine 508, any segment representations in the received and parsed video data streams that match segment representations in the database 510 that were previously stored from video data streams that were previously received and parsed.

5. Communicates the matched segment representations to the content processing platform 516.

The database 510 stores the segment representations and their respective timestamps indicating when the related segment was aired or streamed. In one preferred embodiment, newly received segment representations are stored in the database 510 for about 7 to about 14 days. This time frame is sufficient to detect re-airings of almost all commercials shown across TV stations in the United States, assuming that video data streams are being received from almost all of the TV stations. A shorter time frame, such as 6 hours, is also feasible to detect most commercials under these same conditions. The shorter time frame has the advantage of reducing the amount of storage required by the database 510, as well as the processing overhead required by the search engine 508.

The database 510 also stores a "hit" count for each segment representation. A segment representation that has a hit count greater than "1" is considered a candidate for repeating content. As used herein, a "hit" is an instance where a sample (e.g., segment representation) from the video data stream matches a portion of a previously stored sample in the database 510. As used herein, "hit count" is the number of times that the previously stored sample matches a newly received sample from the video data stream.

The content processing platform 516 performs recognition processing. The platform 516 uses the timestamps of the matching segment representations to retrieve selected content portions of the original video data streams from the memory 512 to use in the recognition processing. To ensure that the entire commercial is retrieved from the memory 512, the content of adjacent segments sufficient to cover the time length of the longest likely commercial is preferably retrieved. In one example, this would be 1 minute before and after the segment's timestamp. However, other retrieval processes are within the scope of the present invention.

Once a commercial has been properly clipped by the platform 516, appropriate identification and metadata is associated with the clip. FIG. 3 of U.S. Pat. No. 9,628,836 (Kalampoukas et al.), which is incorporated by reference herein, shows an example of how commercials are stored with identification information and metadata. Once a commercial is recognized, it may be logged into a library of known commercials. Also, the airing of the commercial may be tracked for auditing purposes, as is well-known in the art. Information regarding the original source of the commercial is stored in the memory 512.

The index builder and content finder in FIG. 4 are components of the search engine 508. The searchable content database in FIG. 4 is the database 510 of FIG. 5.

Figure 6:
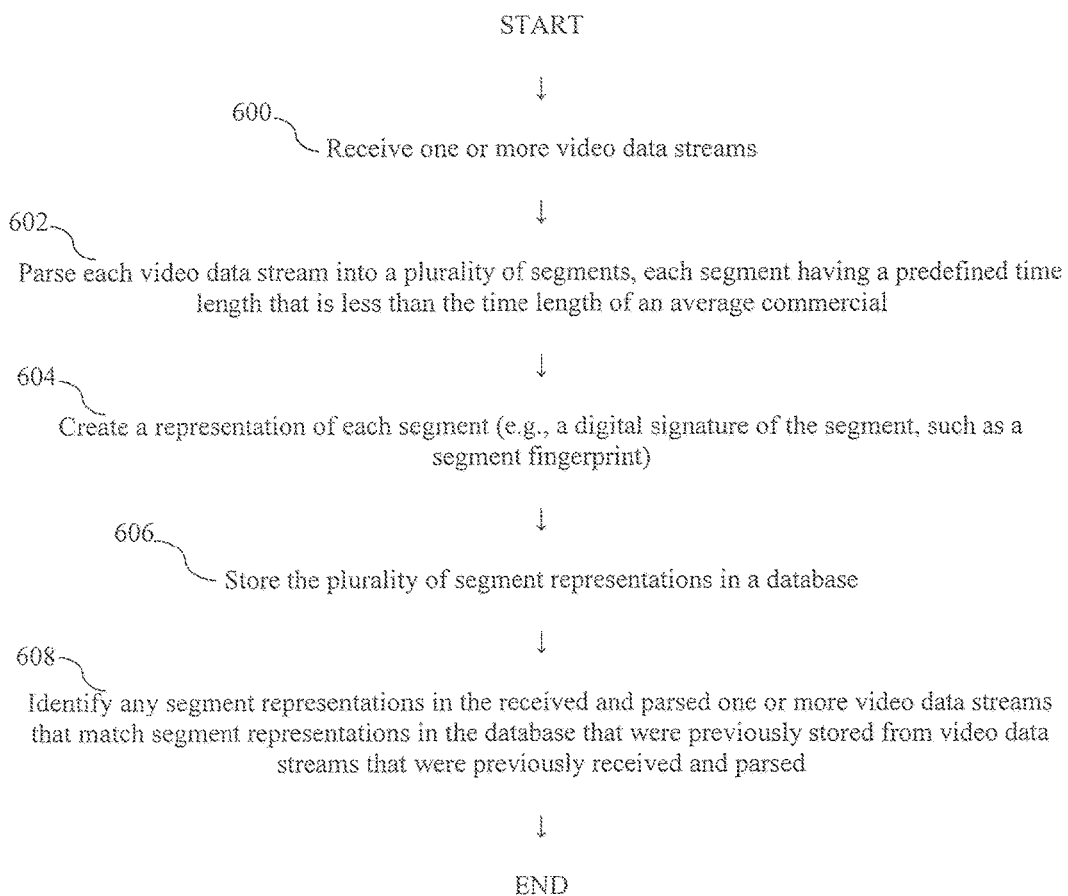
FIGS. 6 and 7 are flowcharts for implementing preferred embodiments of the present invention.

FIG. 6 is a flowchart of one preferred embodiment of the present invention for automatically detecting potential commercials in a video data stream that contains segments of program type content and commercial content, wherein program type content has a time length that is significantly longer than the time length of a commercial, and wherein segment representations of the video data stream are maintained in a database.

STEP 600: Receive one or more video data streams in a video processing engine.

STEP 602: Parse, by the video processing engine, each video data stream into a plurality of segments. Each segment has a predefined time length that is less than the time length of an average commercial.

STEP 604: Create a representation of each segment.

STEP 606: Store the plurality of segment representations in a database. The database includes database records. Each record includes one segment representation and an associated timestamp that represents the time that the segment was aired or streamed.

STEP 608: Identify, by a search engine, any segment representations in the received and parsed one or more video data streams that match segment representations in the database that were previously stored from video data streams that were previously received and parsed. The video processing engine designates the content of each of the identified segment representations as being a portion of one or more potential commercials.

Figure 7:
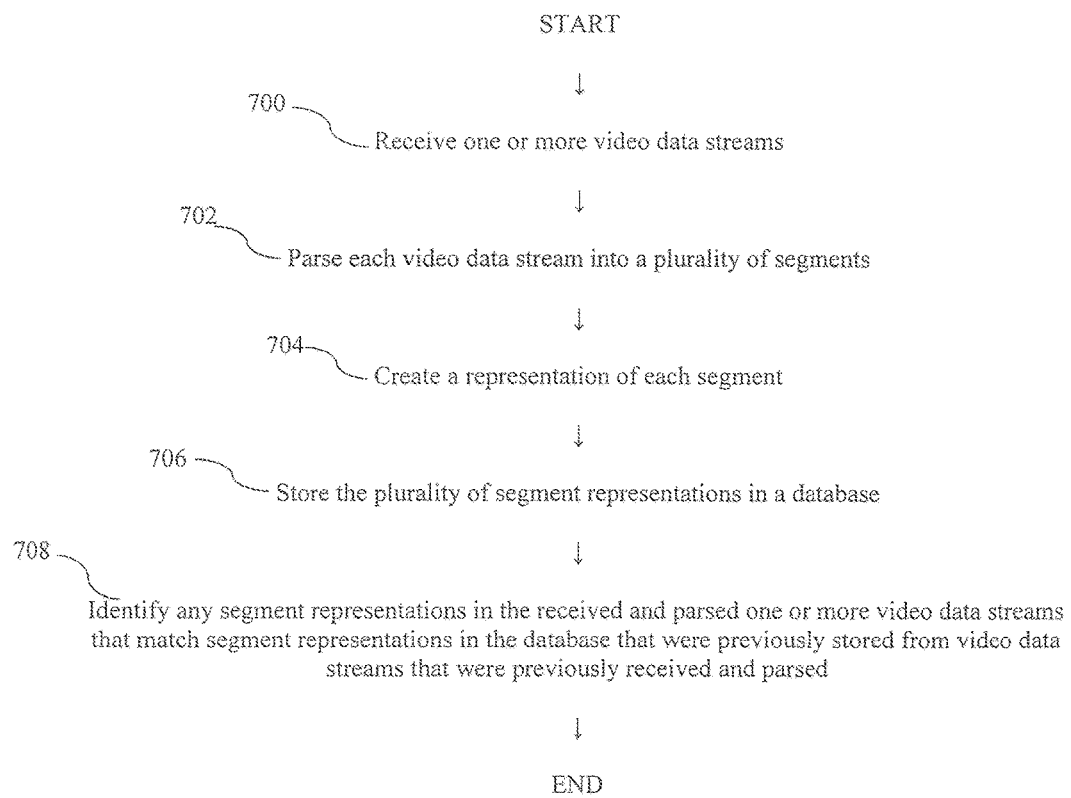

FIG. 7 is a flowchart of one preferred embodiment of the present invention for detecting potential repeating content in a video data stream, wherein segment representations of the video data stream are maintained in a database.

STEP 700: Receive one or more video data streams in a video processing engine.

STEP 702: Parse, by the video processing engine, each video data stream into a plurality of segments.

STEP 704: Create a representation of each segment.

STEP 706: Store the plurality of segment representations in a database. The database includes database records. Each record includes one segment representation and an associated timestamp that represents the time that the segment was aired or streamed.

STEP 708: Identify, by a search engine, any segment representations in the received and parsed one or more video data streams that match segment representations in the database that were previously stored from video data streams that were previously received and parsed. The video processing engine designates the content of each of the identified segment representations as being a portion of repeating content.

III. Additional Considerations

A. Content Segments

In one preferred embodiment, the content segments have a time length of about 2 seconds to about 10 seconds, and more preferably, about 4 seconds. However, the time lengths of the content segments may be longer or shorter depending upon the particular implementation and use case.

B. Search Engine 508

Search engines that perform the type of recognition described above are well-known in the art and are incorporated into automated content recognition (ACR) systems. One type of ACR system having such a search engine uses audio fingerprints within video signals to perform the content recognition. One commercially available audio ACR system is made by Audible Magic Corporation, Los Gatos, Calif. Another commercially available audio ACR system is Gracenote Entourage™ commercially available from Gracenote, Inc., Emeryville, Calif. Other ACR systems are disclosed in U.S. Patent Nos. 2011/0289114 (Yu et al.), 2013/0071090 (Berkowitz et al.), and 2013/0205318 (Sinha et al.), each of which are incorporated by reference herein. Accordingly, the details of the search engine 508 and the database 510 with respect to the recognition processing are not further described.

As is well-known in the art, search engines associated with ACR systems perform the comparisons on representations of content, such as fingerprints of the content. Thus, in one embodiment, the database 510 maintains segment representations in the form of segment fingerprints for comparison with fingerprints of parsed content in the incoming video data stream. As is also well-known in the art, a "fingerprint" is typically composed of a string of individual fingerprints, each capturing a very small time length of the content's audio and/or video.

One preferred embodiment of the present invention described above uses an audio ACR system to perform the functions of the search engine 508. However, it is well-known in the art that ACR systems may use video, as well as combinations of audio and video to perform the content (segment) comparison and recognition, and the scope of the present invention includes such combinations.

In alternative embodiments of the present invention, the search engine 508 may use other types of matching processes than ACR. For example, certain types of tags (e.g., fingerprints) may be embedded in the video data that can be exploited for segment matching. In one embodiment, a broadcaster or advertiser may insert one or more tags in the audio-visual signal for a specific program or commercial. The same program or commercial aired or streamed at a later date would have the same one or more tags. If the video processing engine 502 is programmed to detect such tags, they can be stored in the database 510 and exploited by the search engine 508 in the same manner as described above with respect to the segment representations.

C. Neighboring Segment Representations

As discussed above in the Definitions section, a neighboring segment representation is a segment representation that is next to or very near (not necessarily adjacent to) another segment representation with respect to the timestamps of the corresponding segments. Neighboring segment representations are useful for identifying repeating program content, such as repeating episodes of shows or rebroadcasts of programs, via the following steps:
1. Identify, by the search engine, any plurality of neighboring segment representations that
   (i) match previously stored segment representations in the database, and
   (ii) have a total segment length significantly longer than the time length of an average commercial, wherein the total segment length is the total time length from the first to the last neighboring segment representations as determined from the respective timestamps.
2. Delete as a segment representation of a potential commercial the plurality of identified neighboring segment representations.

D. Audio Data Streaming

In one alternative embodiment, the system described above may be used to detect potential commercials in an audio data stream, which may include (i) a conventional broadcast audio signal, such as AM/FM or satellite radio, or (ii) streaming services that deliver audio content to a user's device that is connected to a network. The same system described above may be used to implement this embodiment wherein the audio data stream is processed in the same manner as the audio portion of the video data stream and the segments are audio segments, and wherein the search engine 508 uses audio-based ACR.

E. Short Program Content

In some types of programming, such as portions of a sports game, the video data stream will not mimic the paradigm of FIGS. 1 and 2 wherein the program type content has a time length that is significantly longer than the time length of a commercial. Instead, the program type content may have a time length that is similar in length, or even shorter, than the time length of a commercial. The scope of the present invention includes the ability to process this type of video data stream in the same manner as described above.

F. Library of Known Commercials

In one alternative embodiment, segments of the current video data stream may be compared to segments in a library of known commercials to eliminate the need to process such segments using the system in FIG. 5 if a match is detected based on this comparison. Stated another way, if the current video data stream includes a known commercial, there is no need to process segments of the commercial to determine if it constitutes repeating content, and thus qualifies as a potential commercial.

Figure 8:
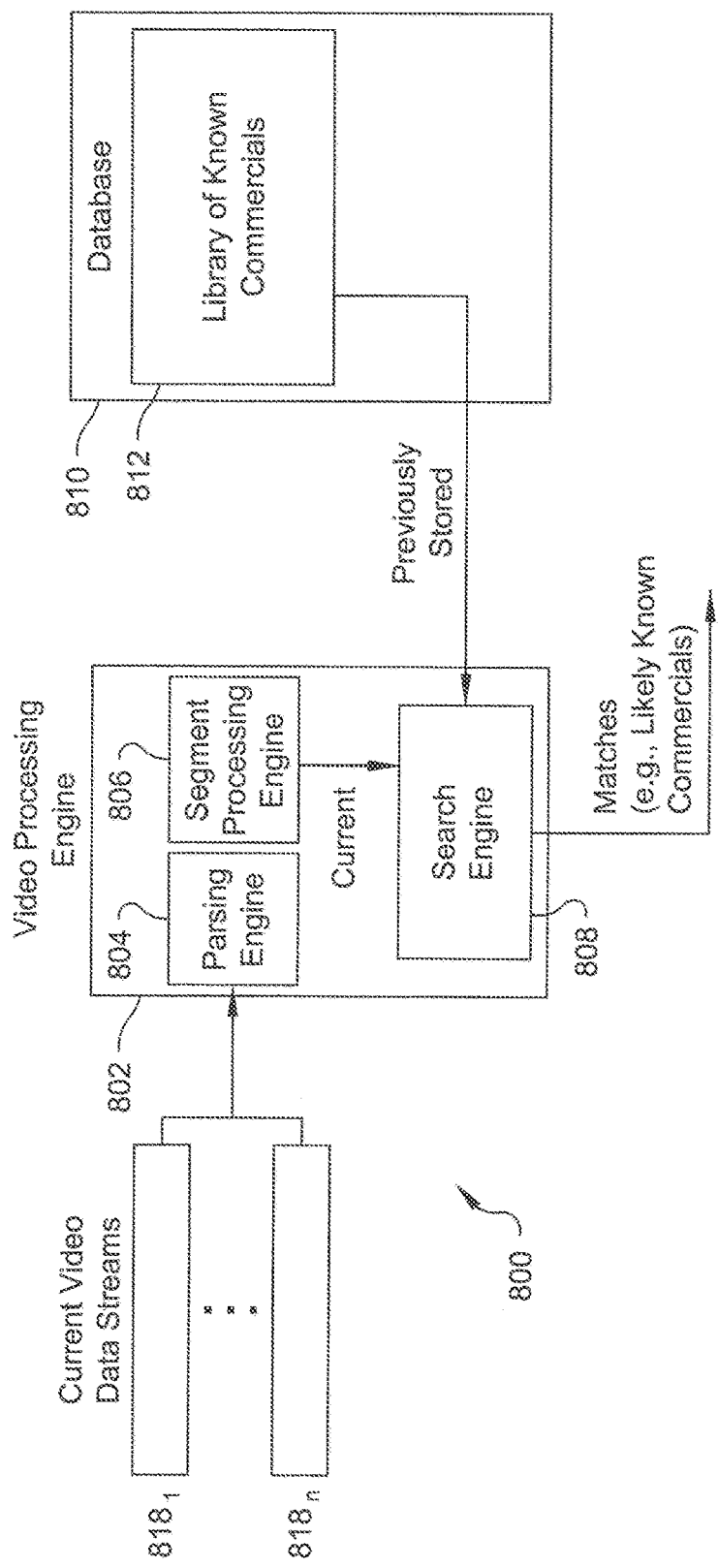
FIG. 8 is a schematic diagram of a system for implementing another preferred embodiment of the present invention.

FIG. 8 shows a system 800 for detecting such known commercials. Current video data streams $818_1 \ldots 818_n$ are inputted to video processing engine 802 which includes a parsing engine 804, a segment processing engine 806 and a search engine 808. The search engine 808 compares segment representations outputted by the segment processing engine 806 with segment representations received from database 810 which includes a library of known commercials 812. Matches represent likely known commercials.

Once detected, the segments associated with the likely known commercial are not processed using the system components of FIG. 5 that detect potential repeating content. The system 800 of FIG. 8 may run in parallel with the system 500 of FIG. 5 and may share similar components and processing elements. For example, the system 800 may use the video processing engine 502 and the database 810 to first detect if the current video data stream includes a likely known commercial. If so, the video processing engine 502 does not perform any further processing to determine if repeating content exist by attempting to match previously stored segment representations with current segment representations. If not, the video processing engine 502 functions as described above to determine if repeating content exist by attempting to match previously stored segment representations with current segment representations.

G. Use of Video-Based ACR and Audio-Based ACR in Combination for Enhanced ACR

In some instances, the potential commercials detected by the processes described above will yield false results, such as when a song or other soundtrack appears in two segments which are completely different from one another. While the false results will likely be detected when the content processing platform 516 performs subsequent recognition processing, it would be desirable to flag or filter out false results prior to subsequent recognition processing so as to reduce the workload performed by the content processing platform.

In one alternative embodiment, the detected potential commercials are further analyzed by a video-based ACR process.

Figure 9:
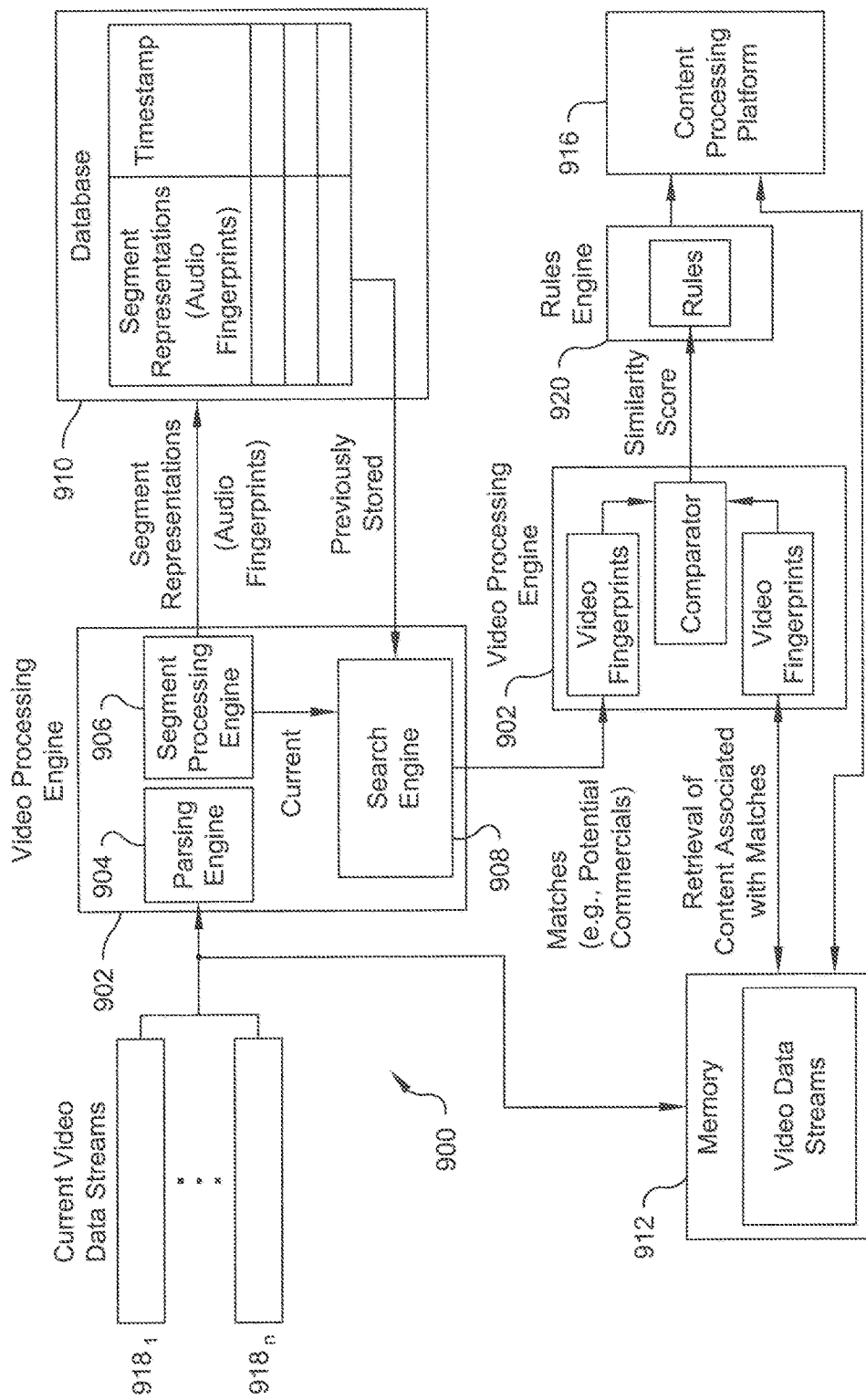
FIG. 9 is a schematic diagram of a system for implementing another preferred embodiment of the present invention.

FIG. 9 shows a schematic diagram of a system 900 for implementing a preferred embodiment of the present invention wherein the detected potential commercials are further analyzed by a video-based ACR process.

The components of system 900 are similar to those shown in FIG. 5, including the following corresponding elements: video processing engine 902 having a parsing engine 904, a segment processing engine 906 and a search engine 908; a database 910; a memory 912 (persistent storage); and a content processing platform 916. The video processing engine 902 and the memory 912 receive current video data streams $918_1$ to $918_n$. However, FIG. 9 differs from FIG. 5 in at least the following ways:

1. The segment representations in the database 910 are audio fingerprints, and the matching that occurs in the search engine 908 operates on audio fingerprints, and the video processing engine 902 performs a subsequent comparison of the matches (e.g., potential commercials) using video fingerprints to obtain a similarity score before any video segments are sent to the content processing platform 916. For illustration purposes only, the video processing engine 902 is shown twice in FIG. 9, once to show its role in the audio fingerprint analysis process, and a second time to show its role in the video fingerprint analysis process.

2. A rules engine 920 is used to determine how, or if, the content processing platform 916 will process the identified repeating segments based on the similarity score.

Figure 10:
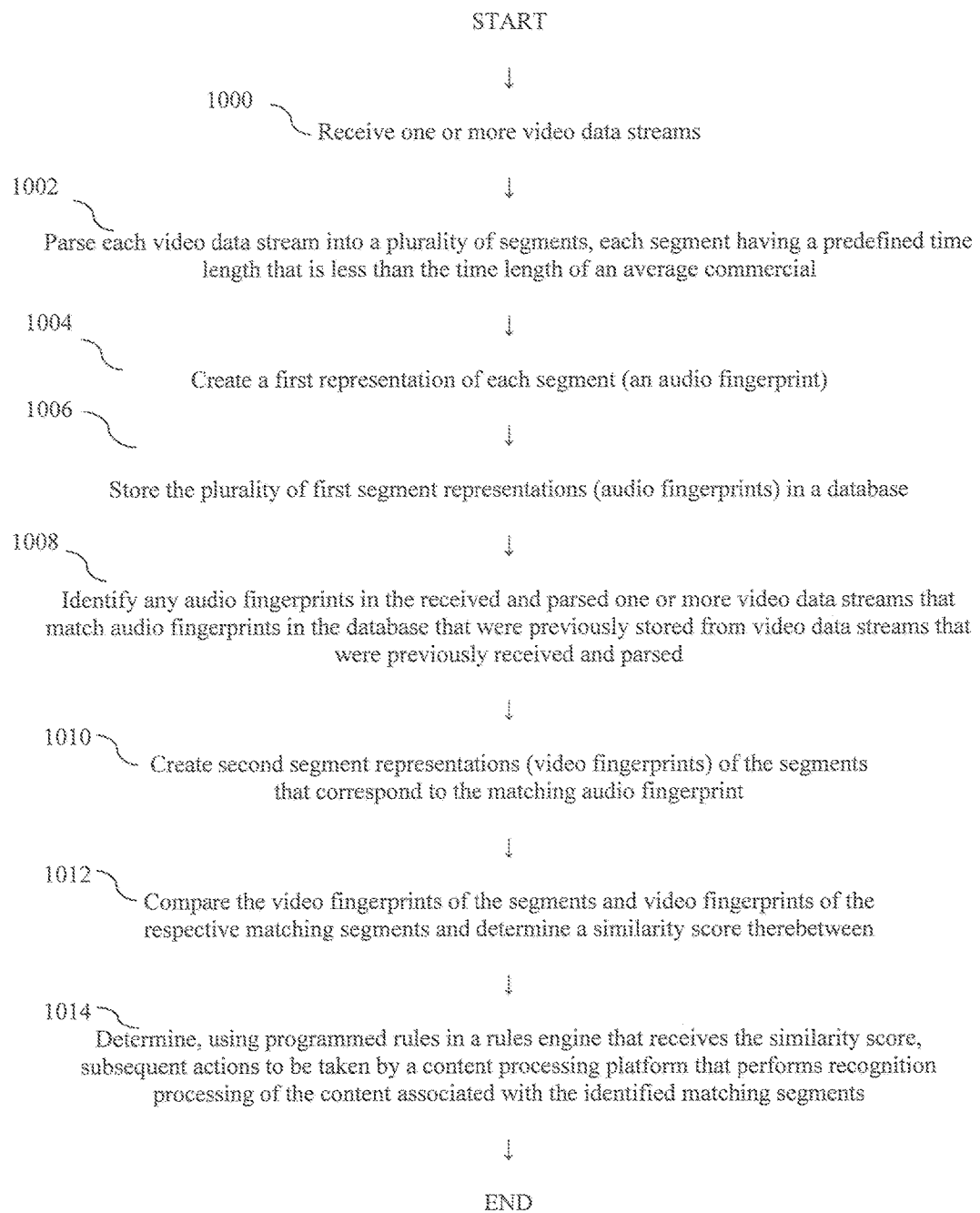
FIG. 10 is a flowchart for implementing the preferred embodiment of FIG. 9.

FIG. 10 is a flowchart for implementing the preferred embodiment of FIG. 9.

STEP 1000: Receive one or more video data streams.
STEP 1002: Parse each video data stream into a plurality of segments, each segment having a predefined time length that is less than the time length of an average commercial.
STEP 1004: Create a first representation of each segment (an audio fingerprint).
STEP 1006: Store the plurality of first segment representations (audio fingerprints) in a database.
STEP 1008: Identify any audio fingerprints in the received and parsed one or more video data streams that match audio fingerprints in the database that were previously stored from video data streams that were previously received and parsed.
STEP 1010: Create second segment representations (video fingerprints) of the segments that correspond to the matching audio fingerprint.
STEP 1012: Compare the video fingerprints of the segments and video fingerprints of the respective matching segments and determine a similarity score therebetween.
STEP 1014: Determine, using programmed rules in a rules engine that receives the similarity score, subsequent actions to be taken by a content processing platform that performs recognition processing of the content associated with the identified matching segments.

The system 900 of FIG. 9 operates as follows:

1. The video processing engine 902 creates additional segment representations of the segments that correspond to the repeating segments identified as a result of the audio-based ACR process described above. Hereafter, the segment representations used in the video-based ACR process are referred to as "second segment representations," whereas the segments used in the audio-based ACR process described above are referred to as "first segment representations." That is, for each matching pair of segments in the audio-based ACR process, a corresponding matching pair of segments are used in the video-based ACR process and second segment representations in the form of one or more video fingerprints of the segments are created.

As discussed above with respect to FIG. 3:
c7 and cz matched c1; c9 matched c2; and cx matched c4
Any content which is observed to be repeatedly appearing in a video data stream can be declared most likely to be a commercial. For example, c1, c2 and c4 are most likely commercials.

The video-based ACR process further creates one or more video fingerprints of each of the following segments (i.e., each segment may have one or more video fingerprints):

c1, c7 and cz
c2 and c9
c4 and cx

2. The video processing engine 902 performs a comparison of the video fingerprints and video fingerprints of the respective matching segments and determines a similarity score therebetween. For example, the one or more video fingerprints of segment c2 are compared to the one or more video fingerprints of segment c9. A high degree of similarity indicates that the segments are even more likely than previously believed from the audio-based ACR analysis to be repeating segments, and thus even more likely than previously believed from the audio-based ACR analysis to be portions of potential commercials. This greatly raise the initial confidence level, such as by a magnitude (e.g., 90% certainty (10% wrongly identified) to 99% certainty (1% wrongly identified)) or more.

Consider again the example wherein a song or other soundtrack appears in two segments which are completely different from one another. While the audio-based ACR analysis will identify these segments as potentially matching, it is extremely unlikely that the corresponding video is similar, and this will be detected by the video-based ACR analysis.

3. The rules engine 920 receives the similarity scores and uses programmed rules to determine subsequent actions to be taken by the content processing platform 916 that performs recognition processing of the content associated with the segments identified by the audio-based ACR analysis as having repeating segments that are likely to be portions of potential commercials. The determination made by the rules engine 920 is based on the similarity score.

One example of programmed rules is as follows:
   i. If the similarity score is above a predetermined threshold level for similarity (e.g., above 95%), the rules engine 920 instructs the video processing engine 902 to electronically communicate the content of the segments to the content processing platform 916 for subsequent recognition processing using automated metadata identification on the content of the segments.
   ii. If the similarity score is at or below a first predetermined threshold level and greater than a second predetermined threshold level (e.g., at or below 95% and greater than 20%) for similarity, the rules engine 920 instructs the video processing engine 902 to electronically communicate the content of the segments to the content processing platform 916 for subsequent recognition processing using manual metadata identification on the content of the segments.
   iii. If the similarity score is below the second predetermined threshold level for similarity (e.g., below 20%), the rules engine 920 instructs the video processing engine 902 not to electronically communicate the content of the segments to the content processing platform 916 for subsequent recognition processing. In this manner, no metadata identification is performed on the segments by the content processing platform 916.

The predetermined threshold levels may be different than those described above, and there may be more or less programmed rules than the example above. The goal of the rules engine 920 is to make an educated guess as to whether the segments should be subjected to automated or manual review for metadata identification, or no review at all if the segment is not likely to even be a repeating segment, and thus, not likely to be a commercial.

For example, in another embodiment, the programmed rules may consist of the following two rules:

i. If the similarity score is above a predetermined threshold level for similarity (e.g., above 95%), the rules engine 920 instructs the video processing engine 902 to electronically communicate the content of the segments to the content processing platform 916 for subsequent recognition processing using automated metadata identification on the content of the segments. This is the same rule i. as above.

ii. If the similarity score is at or below the threshold level (e.g., at or below 95% for similarity, the rules engine 920 instructs the video processing engine 902 to electronically communicate the content of the segments to the content processing platform 916 for subsequent recognition processing using manual metadata identification on the content of the segments.

In this alternative example, all segments identified by the audio-based ACR process are subjected to at least manual metadata identification on the content of the segments. This set of rules guards against scenarios where the video-based ACR might have malfunctioned, and shows low or similarity.

In another embodiment, the programmed rules may consist of the following two rules:

i. If the similarity score is above a predetermined threshold level for similarity (e.g., above 95%), the rules engine 920 instructs the video processing engine 902 to electronically communicate the content of the segments to the content processing platform 916 for subsequent recognition processing using automated metadata identification on the content of the segments. This is the same rule i. as above.

ii. If the similarity score is at or below the threshold level (e.g., at or below 95% for similarity, the rules engine 920 instructs the video processing engine 902 not to electronically communicate the content of the segments to the content processing platform 916 for subsequent recognition processing. In this manner, no metadata identification is performed on the segments by the content processing platform 516.

This alternative embodiment may be suitable in environments wherein the video-based ACR functions with an extremely high degree of accuracy. Experience over time dictates the best set of rules in optimizing false positive and false negative scenarios against the more labor and time-consuming manual metadata identification.

When using video-based ACR to augment the audio-based ACR process, the content of a predefined number of segment representations adjacent in time to the segment representations identified as likely repeating segments is still communicated to the content processing platform for subsequent recognition processing in the same manner as described above with respect to the strictly audio-based ACR process.

Video-based ACR is well-known in the art, and thus is not described in any detail herein. Video-based ACR systems perform image analysis on video frames and create video fingerprints of the video frames, which are then compared to previously stored video fingerprints in a manner similar to audio-based ACR. Any suitable video-based ACR platform may be used for implementing the embodiments described above. One examples of a commercially available program that can perform video-based ACR is Gracenote Video ACR software.

"Video" is often used in the context of including both audio and video components. However, for clarity, the video-based ACR and video fingerprints used herein do not contain any audio components, and thus there is no redundancy of audio information that may be captured in the audio-based ACR in the video fingerprints.

Automated metadata identification is well-known in the art and thus is not described further herein. One examples of a commercially available program that can perform automated metadata identification includes GOOGLE® Cloud Vision API.

The present invention may be implemented with any combination of hardware and software. If implemented as a computer-implemented apparatus, the present invention is implemented using means for performing all of the steps and functions described above.

When implemented in software, the software code for the video processing engine 502, 802, 902 and its search engine 508, 808, 908 can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein for the video processing engine 502, 802, 902 and its search engine 508, 808 may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The video processing engine 502, 802, 902 is not a general-purpose computer, but instead is a specialized computer machine that performs a myriad of video processing functions that are not native to a general-purpose computer, absent the addition of specialized programming.

The video processing engine 502, 802, 902; database 510, 810, 910; memory 512, 912 and content processing platform 516, 916 may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method of detecting potential commercials in one or more video data streams that contain (i) segments of program type content, and (ii) commercial content, the method comprising:
    (a) parsing, by the video processing engine, each video data stream into a plurality of segments, each segment having a predefined time length that is less than the time length of an average commercial;
    (b) creating, by a video processing engine, a first segment representation of each segment, the first segment representation of each segment being one or more audio fingerprints;
    (c) identifying, by a search engine that uses audio-based automated content recognition (ACR) and the audio fingerprints of the segments any repeating segments that are likely to be portions of potential commercials, each of the repeating segments corresponding to different segments of the video data stream that match each other based on their respective audio fingerprints;
    (d) creating, by the video processing engine, second segment representations of only the segments that correspond to the repeating segments identified in step (c), the second segment representations of the segments being one or more video fingerprints of the segments and one or more video fingerprints of the respective matching segments;
    (e) comparing the video fingerprints of the segments and video fingerprints of the respective matching segments in the video processing engine and determining a similarity score therebetween, wherein the video fingerprint comparison is performed only on the segments that correspond to the repeating segments identified in step (c); and
    (f) determining, using programmed rules in a rules engine that receives the similarity score, subsequent actions to be taken by a content processing platform that performs recognition processing of the content associated with the segments identified in step (c), wherein the determination made by the rules engine is based on the similarity score.

2. The method of claim 1 further comprising:
    (g) for the segments that have a similarity score above a predetermined threshold level for similarity, the rules engine instructing the video processing engine to electronically communicate the content of such segments to the content processing platform for subsequent recognition processing; and
    (h) performing automated metadata identification on the content of such segments in the content processing platform.

3. The method of claim 2 wherein for each segment electronically communicated to the content processing platform, the method further comprising:
    (i) electronically communicating the content of a predefined number of segments adjacent in time to the segment, the number of segments being sufficient to capture the entire length of a commercial.

4. The method of claim 1 further comprising:
    (g) for the segments that have a similarity score at or below a first predetermined threshold level for similarity and greater than a second predetermined threshold level, the rules engine instructing the video processing engine to electronically communicate the content of such segments to the content processing platform for subsequent recognition processing; and
    (h) performing manual metadata identification on the content of such segments in the content processing platform.

5. The method of claim 4 wherein for each segment electronically communicated to the content processing platform, the method further comprising:
    (i) electronically communicating the content of a predefined number of segments adjacent in time to the segment, the number of segments being sufficient to capture the entire length of a commercial.

6. The method of claim 1 further comprising:
    (g) for the segments that have a similarity score at or below a second predetermined threshold level for similarity, the rules engine instructing the video processing engine not to electronically communicate such segments to the content processing platform for subsequent recognition processing, wherein no metadata identification is performed on the contents of such segments by the content processing platform.

7. An automated system for detecting potential commercials in one or more video data streams that contain (i)

segments of program type content, and (ii) commercial content, the method comprising:
- (a) a video processing engine configured to:
  - (i) parse each video data stream into a plurality of segments, each segment having a predefined time length that is less than the time length of an average commercial, and
  - (ii) create a first segment representation of each segment, the first segment representation of each segment being one or more audio fingerprints;
- (b) a search engine configured to identify any repeating segments that are likely to be portions of potential commercials using audio-based automated content recognition (ACR) and the audio fingerprints of the segments, each of the repeating segments corresponding to different segments of the video data stream that match each other based on their respective audio fingerprints, the video processing engine further configured to:
  - (iii) create second segment representations of only the segments that correspond to the segments identified as repeating segments, the second segment representations of the segments being one or more video fingerprints of the segments and one or more video fingerprints of the respective matching segments, and
  - (iv) compare the video fingerprints of the segments and video fingerprints of the respective matching segments in the video processing engine and determine a similarity score therebetween, wherein the video fingerprint comparison is performed only on the segments that correspond to the segments identified as repeating segments;
- (c) a content processing platform that performs recognition processing of the content associated with the segments identified as repeating segments; and
- (d) a rules engine including programmed rules and configured to determine subsequent actions to be taken by the content processing platform, wherein the rules engine receives the similarity score and is configured to determine the subsequent actions based on the similarity score.

8. The automated system of claim 7 wherein for the segments that have a similarity score above a predetermined threshold level for similarity, the rules engine is further configured to instruct the video processing engine to electronically communicate the content of such segments to the content processing platform for subsequent recognition processing, wherein the content processing platform is configured to perform automated metadata identification on the content of such segments.

9. The automated system of claim 8 wherein for each segment electronically communicated to the content processing platform, the video processing engine is further configured to:
- (iv) electronically communicate the content of a predefined number of segments adjacent in time to the segment, the number of segments being sufficient to capture the entire length of a commercial.

10. The automated system of claim 7 wherein for the segments that have a similarity score at or below a first predetermined threshold level for similarity and greater than a second predetermined threshold level for similarity, the rules engine is further configured to instruct the video processing engine to electronically communicate the content of such segments to the content processing platform for subsequent recognition processing, wherein the content processing platform is configured to perform manual metadata identification on the content of such segments.

11. The automated system of claim 10 wherein for each segment electronically communicated to the content processing platform, the video processing engine is further configured to:
- (iv) electronically communicate the content of a predefined number of segments adjacent in time to the segment, the number of segments being sufficient to capture the entire length of a commercial.

12. The automated system of claim 7 wherein for the segments that have a similarity score at or below a second predetermined threshold level for similarity, the rules engine is further configured to instruct the video processing engine not to electronically communicate such segments to the content processing platform for subsequent recognition processing, wherein no metadata identification is performed on the content of such segments by the content processing platform.

* * * * *